United States Patent [19]

Schmitz

[11] Patent Number: 4,741,391
[45] Date of Patent: May 3, 1988

[54] METHOD AND APPARATUS FOR RECOVERING OF TRANSMITTED HEAT

[76] Inventor: Johannes Schmitz, Nordstrasse 2, 5162 Niederzier, Fed. Rep. of Germany

[21] Appl. No.: 22,401

[22] Filed: Mar. 6, 1987

[30] Foreign Application Priority Data

Mar. 8, 1986 [DE] Fed. Rep. of Germany ..... 3607719
Jan. 23, 1987 [EP] European Pat. Off. ........ 87100898.3

[51] Int. Cl.$^4$ .............................................. F24H 3/02
[52] U.S. Cl. ......................................... 165/56; 98/31; 237/50
[58] Field of Search ............... 126/400; 237/50, 53, 237/69; 98/31; 165/47, 48.1, 56, 57, DIG. 909, DIG. 901

[56] References Cited

U.S. PATENT DOCUMENTS 3,929,186 12/1975 Becker ................................ 98/31 X
4,411,255 10/1983 Lee ....................................... 98/31 X

FOREIGN PATENT DOCUMENTS 115014 8/1984 European Pat. Off. .
2929070 11/1985 Fed. Rep. of Germany .

Primary Examiner—Henry A. Bennett
Attorney, Agent, or Firm—W. G. Fasse; D. H. Kane, Jr.

[57] ABSTRACT

A body, such as a building to be heated or cooled, is surrounded by a wall structure forming two hollow spaces arranged in parallel to each other. An outer hollow space is connected to the atmosphere so that outside air can flow into the outer hollow space. A separation wall between the outer hollow and an inner hollow space has leakage paths for air to pass from the outer into the inner hollow space which is kept at a reduced pressure relative to the atmosphere to enhance an inward air flow through the leakage paths. Thus, heat passing outwardly through the wall structure heats or cools the air being evacuated from the inner hollow space, depending on the temperature gradient across the wall structure. The evacuated air passes through a heat recovery system which may be connected to a heating system of the building or to a heat storage or to the atmosphere.

26 Claims, 6 Drawing Sheets

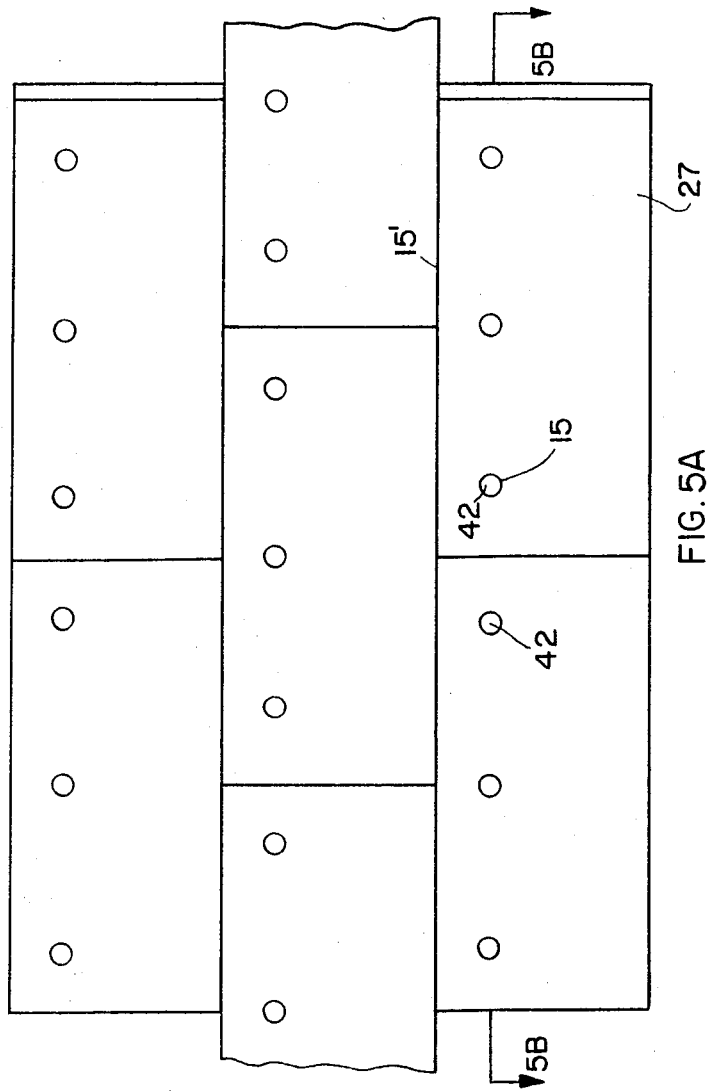

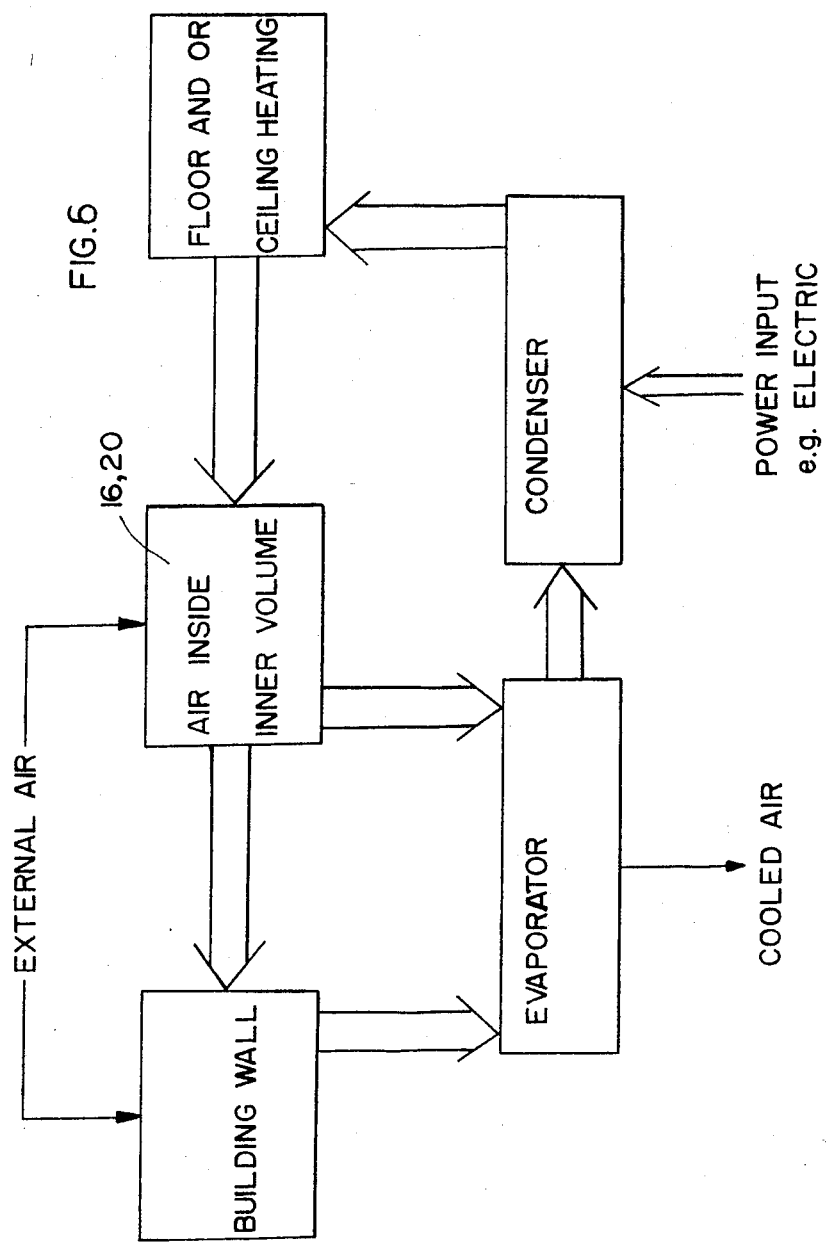

METHOD AND APPARATUS FOR RECOVERING OF TRANSMITTED HEAT

FIELD OF THE INVENTION

The invention relates to a method and to an apparatus for recovering transmitted heat, for example, heat that is transmitted through the walls of a building. The present method and system is especially suitable for heating or air conditioning buildings with a more efficient use of energy.

DESCRIPTION OF THE PRIOR ART

Efforts for minimizing the energy consumption for the heating or air conditioning of buildings have been made heretofore. For example, European Patent Publication No. 115,014 discloses a method and a building construction for this purpose. The method and system in said European Patent Publication are rather efficient. However, it has been found that it nevertheless involves a substantial heat loss. The heat loss in the prior art is primarily caused by heat transmitted from the inside of a building to the surface of its outer walls where this heat is radiated into the atmosphere, thereby heating the atmosphere and causing a respective heat loss. This type of heat loss to the outer atmosphere is the larger the larger the temperature difference between the inside and outside of the building is across a single air circulating flow channel in the walls and roof of a building. There are practical limits which prevent reducing the temperature of the air circulating in the single air flow channel when the external temperatures are low.

German Pat. No. 2,929,070 (Bauer et al) discloses a system for reducing heat transmission losses through a building wall and roof quite similar to European Patent Publication No. 115,014, except the former reference discloses double air circulating channels in the roof. Valve means are so arranged that one or the other of the two parallel channels in the roof may be used in the air circulating system apparently for the purpose of passing the flow of circulating air either through the inner channel or through the outer channel. In the summer the air is circulated through the outer channel in the roof. In the winter the air is circulated through the inner channel in the roof. This feature is supposed to permit using the entire roof as a heat collector. A suggestion toward the claimed invention is not provided by this prior art teaching.

OBJECTS OF THE INVENTION

In view of the foregoing it is the aim of the invention to achieve the following objects singly or in combination:

to provide a method and system which makes it possible to recover a substantial proportion of the heat that is being transmitted from a point of higher temperature to a point of lower temperature, for example, the heat passing through the walls, including the roof of a building;

to provide a method and system which are equally suitable for substantially reducing the heat loss from the inside of a building to the atmosphere or reducing the heat transfer from the atmosphere into a building, in other words, the present system and method are suitable for efficient heating purposes and for efficient air conditioning or cooling purposes;

to simplify an effective temperature control or temperature regulation including a rapid and precise follow-up temperature control or regulation;

to introduce the recovered heat fully or partially back into a building or the like; and to provide a method and system which is even applicable to existing buildings for improving the efficiency of cooling or heating such conventional buildings.

SUMMARY OF THE INVENTION

The method of the invention achieves the above objective by the following steps. The surface of a body or volume such as a building to be heated or cooled according to the invention is enclosed at least partially by a first inner hollow space which in turn is surrounded by a separation wall. The separation wall in turn is surrounded by a second outer hollow space which is then enclosed by an enclosure wall having an outer surface in contact with the atmosphere. Fluid flow passages through the enclosure wall from the atmosphere into the second outer hollow space are located at elevational points as high as possible relative to the body or volume to be heated or cooled. Defined leakage is provided through the separation wall between the inner hollow space and the outer hollow space to assure a certain fluid communication through the separation wall. A suction device is used for keeping at least the inner hollow space at a reduced pressure relative to the atmosphere by sucking air out of said inner hollow space, whereby the air is heated by heat passing from the body or volume through the inner hollow space outwardly. The so recovered heat is returned to the body or into the volume.

In the prior art a single hollow space surrounding a building is used for keeping air in circulation with the aid of a fluid flow device such as a flow pump, whereby air from the inside of the building is added to the circulating air flow in the single hollow space. The invention departs from this prior art teaching by keeping the first or inner hollow space under reduced pressure relative to the atmosphere with the aid of a pump of a heat recovery system. The inner hollow space is connected to the outer hollow space by small flow passages which may be in the form of simple leakage paths through the separation wall between the two hollow spaces. By placing the fluid flow passages through the outer enclosure wall for providing fluid communication between the atmosphere and the outer hollow space, at elevational points located as high as possible, the normally colder and hence denser abmospheric air is thus caused to drop into the second outer hollow space. Thus, the normally higher density of the cooler air in the outer hollow space will naturally provide a higher pressure in the outer hollow space relative to the inner hollow space. This natural pressure difference is increased according to the invention by air removal from the inner hollow space. Accordingly, an air circulation in the inner hollow space around the building, as in the prior art, does not take place according to the invention. Rather, the present teaching establishes an air flow from the outside inwardly in a "radial" direction so to speak. As a result, the temperature difference between the outside atmospheric air and the air in the outer hollow space is almost, or substantially zero. This feature is desirable because it minimizes the loss of transmission heat through the wall structure.

The fact that the temperature in the inner hollow space is larger than the temperature in the outer hollow space is acceptable because any heat transferred through the separation wall into the outer hollow space is used for heating the air in the outer hollow space. The air heated in the outer hollow space is not dissipated to the outer atmosphere, rather, due to the enforced reduced pressure in the inner hollow space,the air will tend to travel inwardly in a substantially "radial direction", whereby any transmission heat taken up by the inward air flow is recovered by the heat recovering device. As a result, heat loss to the outer atmosphere is minimized to an optimal extent.

Due to the optimal reduction of the heat loss, it is possible to correspondingly reduce the total energy input needed for heating the inside of a building. The heat output of the devices used for heating the inside of a building can be correspondingly smaller. For example, proper piping used for a floor and/or ceiling heating system can have inner diameters in the range of about 6 mm to about 8 mm. As a result, costs for such systems are substantially reduced, especially also since the installation of smaller diameter pipes is simplified. Another advantage of such a system is seen in that the lead or system temperature can be approximately within the range of the desired room temperature. In other words, the system temperature does not need to be much higher than the desired room temperature because the temperature gradient between the surface temperature of the surfaces being heated and the temperature in the room can be very small. For example, a floor heating system can keep the floor temperature close to the desired room temperature even if the outside temperatures are very low. Another advantage is seen in that due to the small heat losses, it is possible to use a heat pump in a heat recovery device which is small in its dimensions and it can be operated at an optimal or advantageous efficiency.

Under optimal conditions an equilibrium may be achieved between heat trying to escape and the heat that is being recovered. The method according to the invention is also suitable for substantially preventing or reducing the loss of heat by the surrounding atmosphere to the building. In other words, the present method can be used for air conditioning a building when the external temperature is higher than the temperature desired for the inside of a building. In this instance, heat flowing from the outside through the hollow spaces into a building is recovered in the same way as when the system is used for heating purposes, however, rather than returning the recovered heat into the building, the recovered heat is returned to the atmosphere. The air from which heat has been recovered, may in this instance be used either directly or indirectly in a heat exchanger for cooling the inside of a building. Thus, it is possible, if desired, to even reduce the internal temperature in a building. Even if the external temperature and the temperature in a building are initially equal to each other, but there are many people in a building generating heat, it is possible to avoid an increase in the internal temperature of a building by removing heat with the present method. In this instance hot air inside the rooms of a building are sucked out, heat is being recovered from the sucked out air, and the sucked out air is replaced by fresh air from the outside having a temperature lower than the inside temperature. Heat recovered in this manner can be used for heating structural masses of a building, for example, its basement floor or its foundation where the heat may be stored for later recovery and used for heating purposes. The recovered heat may also be used, for example, for heating water to provide hot water for the building. Another possibility of storing the recovered heat in these instances is to insulate the soil around a building and to install in the soil ducts for heating the insulated soil and to recover the so stored heat at a later time.

The system according to the invention for performing the present method comprises a hollow body such as a building having at least one inner hollow volume with at least one inner collecting shaft or duct inside the hollow volume. One end of the hollow duct is connected with the suction side of a heat recovery device and the other end of the hollow shaft or duct is connected to the hollow volume in the building which is surrounded at least to a substantial extent of its outwardly facing surface by a first hollow space which in turn is surrounded by a separation wall. The first hollow space is connected with the collecting shaft or duct. The building is equipped with heat exchangers which in turn are connected to the heat exchangers of the heat recovery device. The separation wall is in turn surrounded by a second hollow space which is enclosed by an outer enclosure wall having an outer surface facing the atmosphere. The first and second hollow spaces are provided primarily around a zone of the building reaching into the atmosphere. Defined leakage passages or ducts are provided between the inner first hollow space and the outer second hollow space through the separation wall. The first hollow space and the volume inside the building are connected through the collecting ducts with the suction side of the heat recovery device. This connection may comprise controllable means for controlling the air flow. The suction device produces a continuous reduced pressure inside the building volume and inside the first and second hollow spaces relative to the atmosphere. Fluid flow passages located at elevational points as high as possible relative to the building, connect the atmosphere to the second outer hollow space so that the surrounding air of the atmosphere can enter through these fluid flow passages into the second outer hollow space and,due to the reduced pressure, through the leakage ducts into the inner hollow space, whereby the atmospheric air takes up heat from the heat passing from the inner volume of the building outwardly through the hollow spaces and through the separation wall.

This just described structure according to the invention encloses substantial zones or surface areas of a building with the two hollow spaces in double layer fashion so to speak. The air volume or masses in these two hollow spaces are not kept in circulation by a pump, but rather, are sucked off by a suction pump of the heat exchanging device. The construction of such a building is very simple and no special requirements need to be met by the mentioned inner and outer hollow spaces. Even the shape of these hollow spaces is not critical because the flow speed of the sucked off air is very small for an effective recovery.

BRIEF DESCRIPTION OF THE DRAWINGS

In order that the invention may be clearly understood, it will now be described, by way of example, with reference to the accompanying drawings, wherein:

FIG. 5A is a detail of the wall structure primarily of the separation wall between the first inner and second outer hollow space and between the inner hollow space and the inner volume of the building;

FIG. 6 is a block diagram of the energy flow in a system according to the invention.

DETAILED DESCRIPTION OF PREFERRED EXAMPLE EMBODIMENTS AND OF THE BEST MODE OF THE INVENTION

Figure 1:
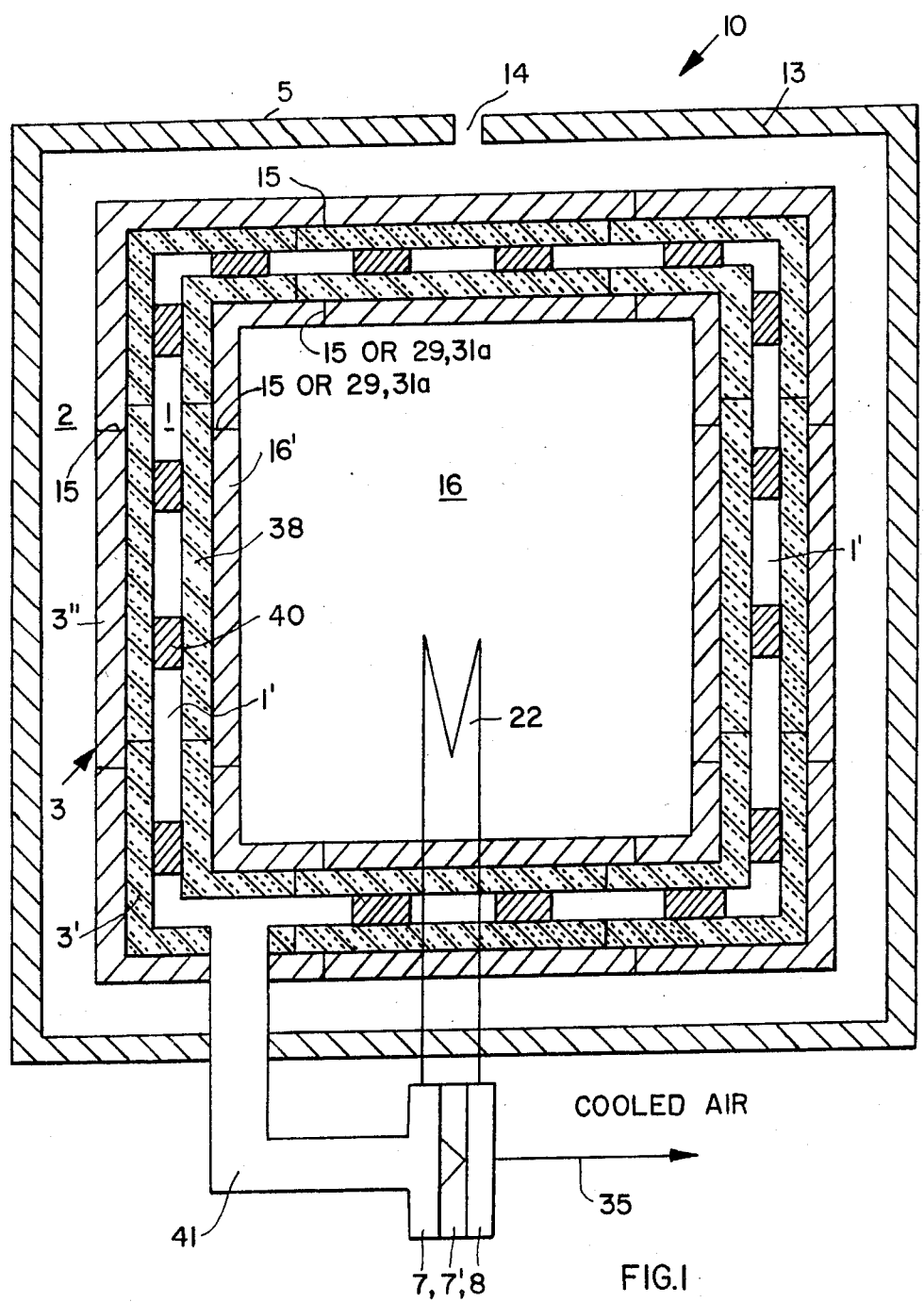
FIG. 1 is a simplified sectional view in a horizontal plane through a body or building constructed for performing the method according to the invention.

The horizontal section through a body 10 shown in FIG. 1 may symbolize any type of enclosure, such as a building, a pipeline, a container or the like. An inner volume 16 is enclosed by a conventional interior wall 16' which in turn is surrounded by heat insulation 38. The heat insulation 38 is surrounded by a first inner hollow space 1 which may be divided into a plurality of flow channels 1' by spacer members 40. All the flow channels 1' communicate with one another for an evacuation. A separation wall 3 separates the first inner hollow spaces 1 from a second outer hollow space 2. The separation wall 3 may be constructed as a double wall having an inner heat insulating portion 3' and an outer structural portion 3" both of it maybe of the same material. The second outer hollow space in turn is enclosed by an outer enclosure wall 13 having an outwardly facing surface 5. The wall components 16', 38, 3', and 3" are constructed of structural elements 27 so arranged that defined leakage paths 15 are provided between the inner volume 16 and the first hollow spaces 1, here in the form of the flap 31a as well as between the inner hollow spaces 1 and the outer hollow space 2. The structural elements 27, shown in FIG. 5A are made to include heat insulating features. The leakage channels 15 may be holes or slots existing between the abutting surfaces of the element 28 which provides for the required flow communication.

Inlet ducts 14 through the outer enclosure wall or skin 13 permit the atmospheric air to enter into the outer hollow space 2. For this purpose the ducts 14 are located at an optimally high elevation relative to the structure 10 such as a building to enhance the entry of the atmospheric air into the hollow space 2 connected to the hollow space 1 through the mentioned defined leakage channels 15. The inner hollow spaces 1, 1' are connected to a channel 41 which in turn is connected to the suction port of a heat recovery system 7, 7', and 8. The discharge port 35 of the heat recovery system delivers cooled or heated air, for example to the atmosphere. Heat exchanger means 22 located in the inner volume 16 are connected to the heat recovery system 7, 7', and 8. Thus, heat may be supplied into the volume 16 or heat may be withdrawn from the volume 16 through the heat exchanger 22.

Figure 2:
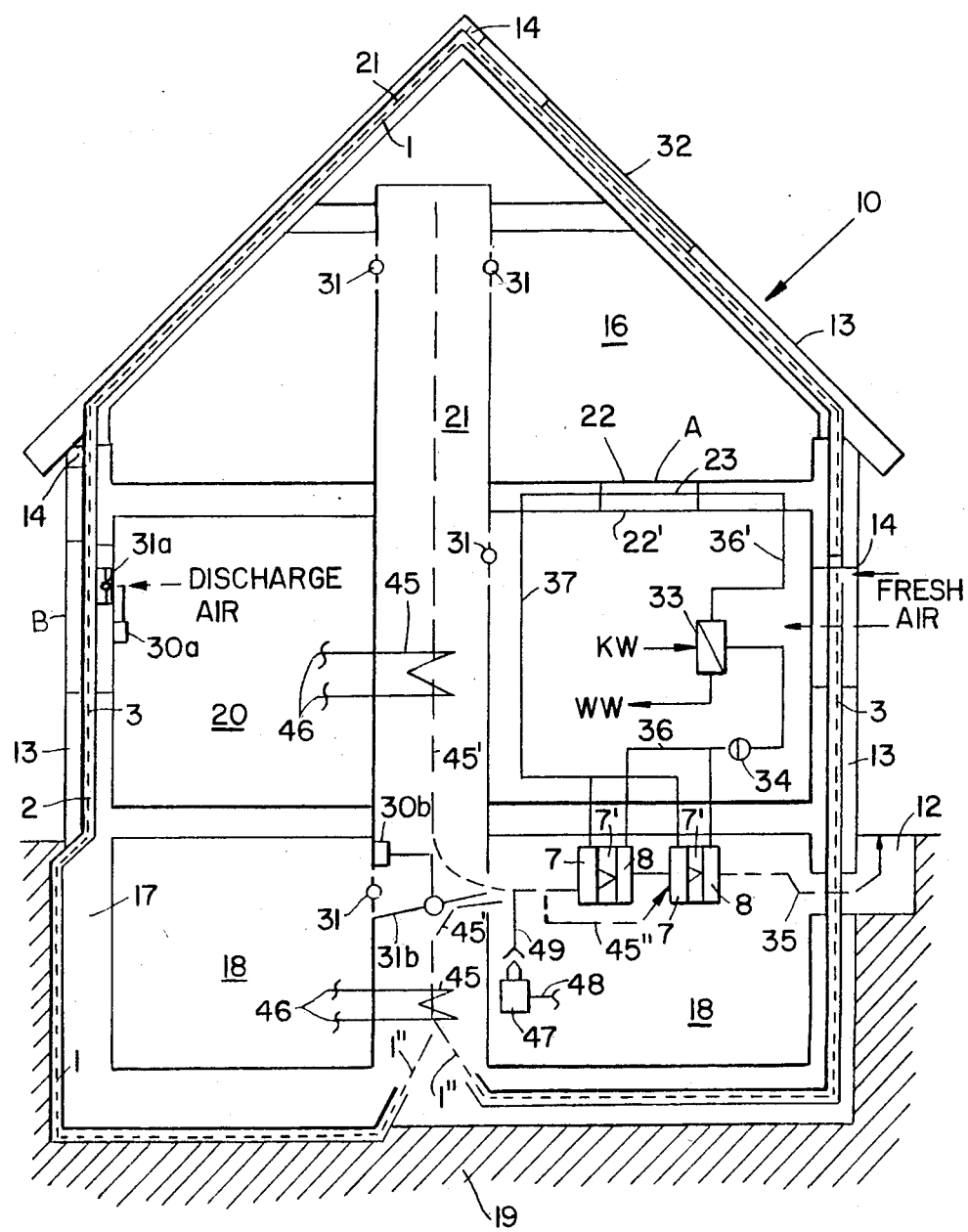
FIG. 2 is a vertical sectional view through a private dwelling constructed according to the invention.

The schematic view of a building shown in FIG. 2 shows that the entire volume 16 of the building 10 is enclosed by two hollow spaces 1 and 2 in the building walls including in the roof 32. The roof 32 is considered to be part of the outer wall 13 and coin function as contain a solar collector. The hollow spaces 1 also extend through the mass of the foundation 17 in form of a plurality of pipes. The spaces 18 enclosed by the foundation are normally not heated. The foundation 17 extends down into the soil 19. If desired, the means for forming the inner and outer hollow spaces 1 and 2 may run on the outside of the foundation wall 17 as shown in the left-hand part of FIG. 2. Thus, the two hollow spaces 1 and 2 could be located between the foundation wall 17 and the soil 19, for example, if an existing building is to be improved in accordance with the present teaching.

A central collecting shaft or duct 21 extends inside the building passing from the basement 18 through the living quarters 16 and 20. A heating unit 45 is mounted in the shaft or duct 21. Ducts or energy supply lines 46 connect the heating device 45 to a source of energy such as a boiler not shown. Any conventional heating device is suitable and the heating device may be controlled, for example, through a thermostat as is customary.

The heater 45 may, if desired, be used for supplying heat to the heat pump 7' through a heat exchanger 7 as indicated by the dashed line 45'. The interior of the duct 21 is connected with the inner hollow space 1 in fluid communication as indicated at 1". Further, the inner volume 18 is connected with the duct 21 through adjustable vents 31. Similarly, the inner volumes 16 and 20 are in fluid communication with the inside of the shaft or duct 21 through respective adjustable vents 31. The fluid communication between the inner hollow space 1 and the shaft 21 is preferably located near the basement floor, or at least in the zone of the foundation 17.

An adjustable control flap 31b located inside the duct 21 is used for controlling the pressure and throughput distribution between the medium proportion sucked out of the volumes 16, 18, and 20 on the one hand, and the volume sucked out of the inner hollow space 1 on the other hand. The suction is accomplished by a ventilator 8 which forms part of the heat recovery system including the heat pump 7' and the heat exchanger 7. A humidifier 47 is connected through a conduit 49 to the suction inlet of the heat exchanger 7 for supplying moisture to the air sucked into the heat recovery system. If desired, heat may also be supplied through the humidified to the air sucked into the heat recovery system. The humidifier 47 has an inlet 48 connected to a water main or the like. The operation of the humidifier 47 is controlled by a respective control mechanism of conventional construction and responsive to the relative humidity. The humidifier 47 and the heat recovery system 7, 7', and 8 are preferably located in the basement, that is, in an inner volume 18 that is not heated. The heat recovery system 7, 7', 8 is connected with an air discharge conduit 35 leading, for example, through the basement wall 17 to the atmosphere through a manhole 12 or the like. As shown in FIG. 2 heat exchanging system is provided as a system, comprising for example two heat exchangers 7, two compressors or heat pumps 7', two ventilators or fans 8 and respective expansion valves not shown as well as only one of each part but more than one compressor. The two systems are connected in series or in parallel with regard to the air coming from the heat exchanger 45 as shown in FIG. 2. The parallel connection is provided by the duct 45". Heat recovered by the system 7, 8, 7' is supplied through a pipe or conduit 36 and through a circulating pump 34 to a further heat exchanger 33 which may, for example, heat a hot water supply or a swimming pool or the like. An output conduit 36' of the heat exchanger 33 is connected to heating pipes 23 forming a heater in a floor 22 or land in a ceiling 22' as will be described in more detail with reference to FIG. 3. The heat transmitting fluid may, for instance, be water pumped by the pump 34 through the pipes 23 and through a return pipe 37 back to the heat recovery systems 7, 7', and 8.

Figure 3:
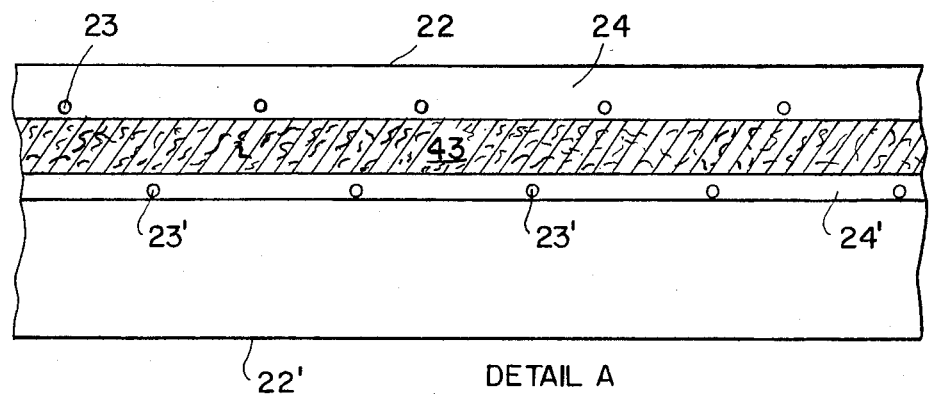
FIG. 3 shows a detail sectional view through a portion A of a floor and ceiling structure in FIG. 2, illustrating the arrangement of a ceiling and floor heating system.

FIG. 3 shows, on an enlarged scale, the detail A of FIG. 2 illustrating a floor 22 and a ceiling 22'. The structural details regarding the strength of the structure are not shown, since they are conventional. A heat insulating layer 43 separates the floor heating pipes 23 from the ceiling heating pipes 23'. The floor heating pipes 23 are embedded, for example, in a suitable floor forming substance, such as a layer 24 of concrete or the like. The ceiling heating pipes 23' are embedded in a similar layer 24', for example, of plaster of paris. It has been found that relatively low heat quantities must be transported for maintaining the temperature in the volumes 16, 20. Thus, the temperature gradient between the room temperature and the water flowing through the heating pipes 23, 23' may also be very small. As a result, the heating pipes 23, 23' may have a smaller inner diameter than heretofore. It has been found that a diameter in the order of 6 to 8 mm is satisfactory. This has the advantage that the installation of the pipes 23, 23' is greatly facilitated. Costs are respectively reduced. Copper or plastics material are suitable for the pipes.

Figure 4:
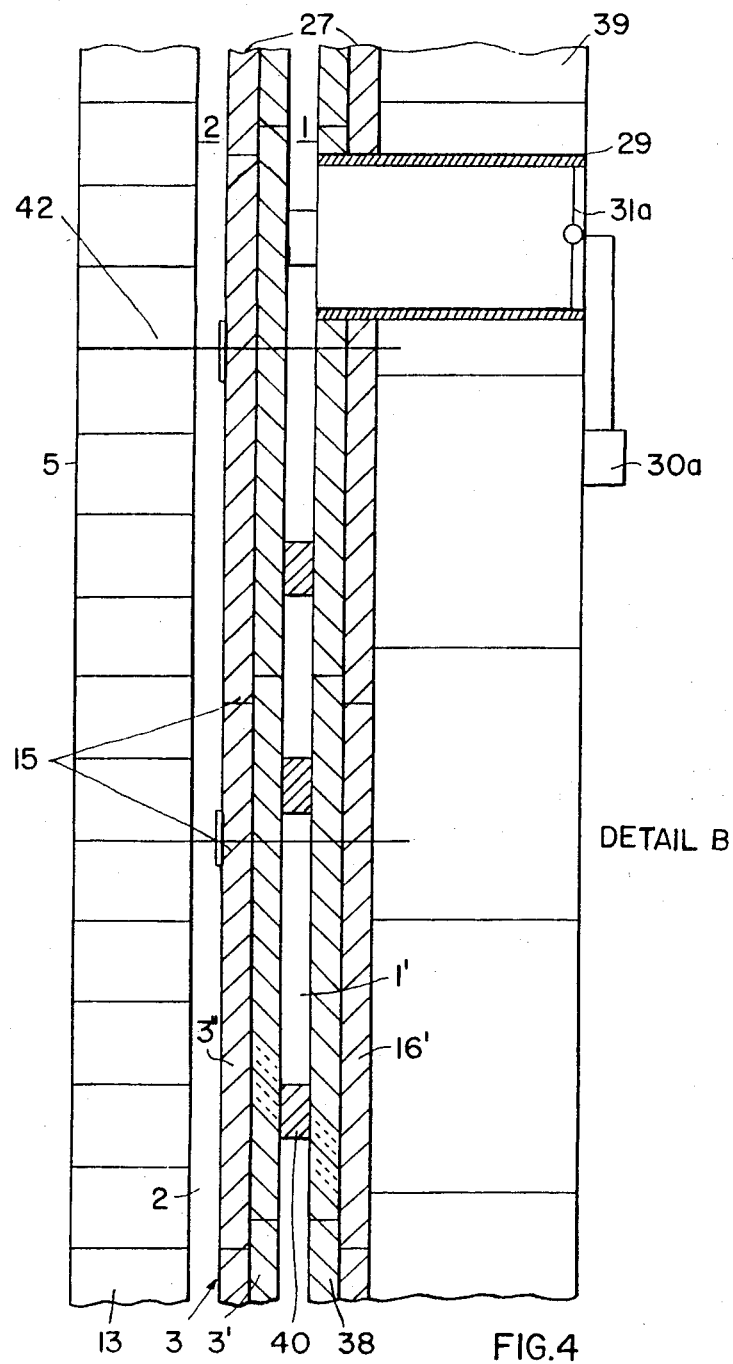
FIG. 4 is a detail sectional view through a portion B of a wall structure shown in FIG. 2.

The enlarged illustration of FIG. 4 shows a detail B of the wall construction. The structure is substantially the same as shown in FIG. 1. However, FIG. 4 shows the leakage duct 15. The outer wall 13 may, for example, be constructed as a brick veneer wall. The inner wall 39 builded inwardly of the wall 16' may, for example, be made of building blocks. The inner wall may also be constructed of bricks. The separation wall 3 is constructed as described above with reference to FIG. 1. It is desirable that as much of the structure of a building projecting above the ground level should be enclosed by the outer enclosure wall 13 to form the second outer hollow space 2. This hollow space 2 may also be subdivided into a plurality of channels similar to the channels 1' formed by the studs 40. Such separating studs may also be inserted between the brick veneer 13 and the outer section 3" of the separation wall 3. In any event, all the channels of the hollow space 2 would communicate with each other. In connection with existing buildings the wall portion 16' may be a stucco layer to which the heat insulating layer 38 is applied by conventional means. Hard foam tongue and groove panels may form the two heat insulating layers 38 and 3' and such panels may be interconnected as standard structural items by the studs 40. Any conventional way of assembly is suitable, for example, brackets or adhesives or interlocking hardware may be used. The inner volume such as the rooms 20 are connected to the inner hollow space 1 through a duct 29 passing through the wall structure 39. A flow control flap 31a is arranged in the duct 29. The flap 31a is shown in the duct closing position. The flap control motor 30a for opening and closing the flap 31a is responsive to the pressure difference in the inner hollow space 1 and the inner volume. Thus, the volume flow can be controlled in accordance with the desired pressure difference. For practical purposes this pressure difference should be about to 20 pascal.

Basically, the structure shown in FIG. 4 can also be used in the construction of the roof 32 shown in FIG. 2. The vents between the atmosphere and the second outer hollow space 2 will be located at elevational levels as high as permitted by the building. FIG. 2, for example, shows that a ridge vent 14 connects the outer second hollow space 2 with the atmosphere so that the external air can enter into the outer hollow space 2. Due to the construction of the invention which provides defined leakage between the second outer hollow space 2 and the first inner hollow space 1 through the partition wall 3 and since the first inner hollow space 1 is under reduced pressure, the air travels "radially" from the outside through the space 2, through the defined leakage ducts 15, into the hollow spaces 1, and from these hollow spaces 1 into the heat recovering system 7, 7', 8. Thus, in a system according to the invention, the air does not circulate in these hollow spaces 1 and 2, but rather, passes through these hollow spaces. As a result, heat that wants to travel from the inner volume 16, 20, 18 outwardly, will heat the air coming into the inner hollow space 1. The heat taken by the inner hollow space 1 is then recovered by the heat recovery system 7, 7', 8. Normally, the temperature of the air in the second hollow space 2 will be lower than the temperature in the first hollow space 1. Thus, even the air in the second hollow space 2 can take up heat that wants to travel outwardly. However, the temperature gradient between the first and second hollow spaces 1 and 2 will be relatively small and the heat transfer will be respectively small. It has been found, that most of the heat still trying to travel outwardly through the hollow space 2 is recovered, particularly along the outer surface of the outer wall portion 3" and because the air travels inwardly due to the pressure differential across the defined leakage ducts 15. In conventional structures in which there is only one air circulating duct enveloping a building, such heat that passes through the envelope is lost in prior art structures. The invention avoids such heat loss.

Figure 5B:
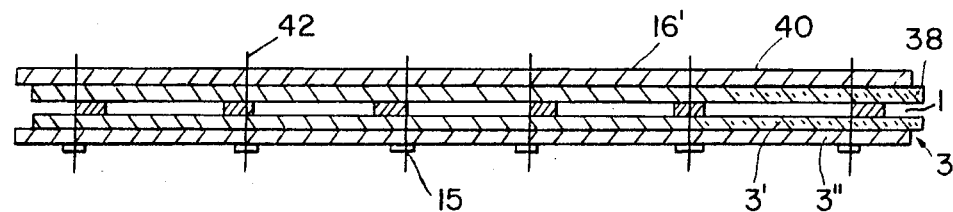
FIG. 5B is a sectional view along section line 5B—5B FIG. 5A.

FIGS. 5A and 5B show the construction of the separation wall 3. The controlled leakage is provided by tubular members 15 passing through all wall portions 16', 38, 3', and 3". The leakage is also provided along the joints 15' between the structural components or panels 27 forming the walls. Conventional hardware elements 42 may pass through the tubular members 15 for mounting the separate wall members or elements in place.

As mentioned above, the present system is also suitable for air conditioning when the temperature of the atmospheric air is higher than the temperature desired in the inner volumes 16, 18, and 20. In that case, the air in the second outer hollow space 2 will be warmer than the air inside. As a result, transmission heat will pass through the control leakage ducts 15 from space 2 into space 1, whereby transmission by direct radiation through the separation wall 3 is also possible. The so warmed air will also be sucked out of the hollow spaces 1 until the temperature in the hollow space 1 reaches the temperature in the inner volumes, whereby further heat transport from the outside into the inner volumes is stopped because there is no further temperature gradient between the temperature in the hollow spaces 1 and the inner volumes 16, 18, and 20. The heat recovered from the spaces 1 is returned to the atmosphere. The operation is the same as when heat travels from the inside outwardly. In the latter case the heat is returned into the spaces 16 and 20 for heating purposes. If heating is not required, the recovered heat may be used for heating the water supply or a swimming pool or the like. Such heating may take place in both instances, regardless whether the heat is recovered due to the outside temperature being higher or due to the inside temperature being higher. The cooled down air is passed through the outlet conduit or duct 35 through the manhole 12 to the atmosphere.

The method and apparatus according to the invention avoid heat loss substantially completely. Therefore, the power rating and power consumption of the heat recovery system can be surprisingly low. A further advantage is seen in the fact that the heat exchanger 22 and the respective heating systems in the floor and/or in the ceiling must transport relatively small heat quantities. As a result, smaller diameter pipes may be used for these heating systems as mentioned above. Moreover, the temperature difference between the heating system and the rooms to be heated or cooled can also be kept at an optimally low value since small heat quantities need to be transported. As a result, the respective heat pump 34 can also have a low power rating at which the heat pump may operate at optimal efficiency.

FIG. 6 shows a heat flow diagram of a system according to the invention. Heat passing from the inner volumes 16, 20, through the enveloping structure is recovered in the evaporator of the heat recovery system 25 which also receives heat from the inner volumes directly. The cooled air is discharged to the atmosphere and the heat is passed to the condenser driven by, for example, an electrical motor and the condenser transmits the heat to the floor and/or ceiling heating system 30 which in turn heats the inner volumes. Thus, it will be seen that the system according to the invention involves a substantially closed heat circulating system. Temperature control is achieved by regulating the air flow or by invading the closed circuit as indicated by the inputs of atmospheric air into the inner spaces 1 and 2 of the enveloping shell of the structure.

The present system is also well suited for using the structural substance of a building for heat storage and such storage may even be extended to include the surrounding soil. Thus, the building mass and the surrounding soil may be used as heat buffers. It is desirable to reduce the temperature of the air sucked out of the hollow spaces 1 to the temperature of the atmospheric air to keep the temperature gradient between the atmospheric air and the air in the hollow space 2 as small as possible, or preferably at zero. As a result, the respective heat pump can work in an optimal range. By providing the ability of supplying recovered heat to the outside, the resulting cooled air can be used for air conditioning purposes. The temperature control is especially simple by merely controlling the throughflow, for example, with the control flaps shown at 31a and at 31b.

By providing the heat content or inner energy of the fluid to be heated and of the heating fluid to be substantially equal to each other, it is assured that the control requirements are substantially simplified and heat losses are avoided. This feature also has the advantage that a follow-up control or regulation can be achieved quickly and precisely to hold, for example, the room temperature at a constant value.

Due to the efficient heat recovery achieved according to the invention, the above mentioned pipes for ceiling and/or floor heating systems can be inexpensive, whereby the construction costs are reduced compared to the prior art. The construction costs are further reduced because the heat pump or pumps according to the invention may be smaller than was needed heretofore.

By arranging several heat pumps in series, the heat pumps may be progressively smaller in their capacity so that, depending on requirements, one or more heat pumps may be used.

For new buildings it is possible to use structural components which already have the two hollow spaces built in, so to speak, including the leakage paths 15. In existing structures the two channels may be formed by intermediate separation panels and by an outer veneer wall. Thus, the invention is very versatile in its application to new and existing structures. In any event, factory produced structural components may be used for the present purposes, whereby the required heat insulating layers are integrated into such structural components in an inexpensive manner.

By using hallways and stairways for the central hollow shaft or duct 21, building costs are further reduced as far as the present purposes are concerned. Similarly, an existing flue may be used for drawing external air into the building and preheating such external air.

By properly placing the flow volume control members such as 31a and 31, it is possible according to the invention, to individually control the heat in any of the rooms of a building.

The roof structure may be such that it forms a so-called "air collector" which is connected with the first hollow space 1 either directly or through a flow control device. Thus, with the aid of such an "air collector" it is possible to influence the temperature and reduced pressure in the hollow space 1 in a simple manner. The thus recovered solar energy can be used for heating purposes, for example, heating a swimming pool.

By placing a heat exchanger into the lead pipe of a heating system, as taught herein, the continuous operation of a heat pump at a relatively low power rating, and at an advantageous efficiency is achieved in an economical manner since any excess heat is used in such a heat exchanger without adversely affecting the desired room temperature. Any hot water that has been used in the building can also be passed through a further heat exchanger to recover heat of the used water. By properly controlling the air flow, for example, at 31a and 31b, it is possible to influence the volume and reduced pressure in the inner space within certain limits in such a way that the power rating and efficiency of the heat pumps is advantageously influenced. More specifically, the adjustment flap 31b can effectively control either manually or in a closed loop circuit the volume throughflow through the heat pump.

Although the invention has been described with reference to specific example embodiments, it will be appreciated that it is intended to cover all modifications and equivalents within the scope of the appended claims.

What I claim is:

1. A method for recovering heat transmitted through a wall structure enclosing an inner hollow volume relative to the atmosphere, comprising the following steps:
   (a) enclosing a substantial surface proportion of said structure with a first inner hollow space and a second outer hollow space separated from each other by an intermediate separation wall, said second outer hollow space being separated from the atmosphere by an outer enclosure wall,
   (b) providing leakage flow paths through said intermediate separation wall for flow communication between said first and second hollow spaces, (c) locating duct means only at elevations as high as determined by said structure through said enclosure wall for flow communication between the atmosphere and said second outer hollow space, (d) sucking air out of said first inner hollow space for maintaining said first inner hollow space at a reduced pressure relative to the atmosphere, said reduced pressure in said inner hollow space causing an inward air flow from said second outer hollow space through said leakage flow paths into said first inner hollow space, said inward air flow travelling substantially in a direction opposite to any outward heat transmission through said intermediate separation wall, whereby said inward air flow takes up heat from said outward heat transmission, and (e) recovering heat from air sucked out of said first inner hollow space for heating or air conditioning.

2. The method of claim 1, wherein at least a portion of any recovered heat is returned into said inner hollow volume or part thereof.

3. The method of claim 1, wherein said step of sucking air out of said first inner hollow space involves passing air through a heat storing mass such as a structural mass of a building or soil surrounding a building.

4. The method of claim 1, wherein said step of recovering heat from air sucked out of said first inner hollow space involves cooling said air to a temperature corresponding to the temperature of the atmosphere to establish a quasi-static heat exchange.

5. The method of claim 1, wherein heat recovered in said heat recovering step involves cooling a fluid to provide a cooled fluid, said method further comprising returning heat to the atmosphere and passing said cooled fluid through structural components of a room to be cooled.

6. The method of claim 1, further comprising controlling a flow volume or throughput of a fluid carrying recovered heat for influencing a temperature gradient between said fluid carrying recovered heat and the atmosphere.

7. The method of claim 1, wherein an inner energy of a first fluid participating in a heat distribution is adapted to an inner energy of a second fluid, the temperature level of which is to be influenced, whereby the heat content of said first fluid is approximately equal to the heat content of said second fluid.

8. An apparatus for recovering heat through walls of a structure enclosing an inner hollow volume, comprising first inner wall means and intermediate separation wall means for enclosing a first inner hollow space between said first inner wall means and said intermediate separation wall means, second outer enclosure wall means for enclosing a second outer hollow space between said second outer enclosure wall means and said intermediate separation wall means, leakage flow path means through said intermediate separation wall for providing a flow communication between said first and second hollow spaces, duct means located only at an elevation as high as determined by said structure and extending through said second outer enclosure wall means for flow communication between the atmosphere and said second hollow space, heat recovery means including suction pump means and means connecting said suction pump means to said first inner hollow space for maintaining said first inner hollow space at a reduced pressure relative to the atmosphere thereby causing an inward air flow from said second hollow space through said leakage flow path means into said first inner hollow space, said inward air flow travelling substantially in a direction opposite to any outward heat transmission through said intermediate separation wall, whereby said inward air flow takes up heat from said outward heat transmission, and heat exchanging means connected to said suction pump means for recovering heat from air sucked out of said first inner hollow space for heating or air conditioning.

9. The apparatus of claim 8, wherein said means for connecting said suction pump means to said first inner hollow space comprise a hollow collecting shaft or duct extending into said inner hollow volume and communicating with said inner hollow volume, said suction pump having a suction end connected to said hollow shaft and to said first inner hollow space.

10. The apparatus of claim 8, wherein said structure comprises tubing forming a heat exchanger embedded in plaster or a similar substance in said structure, and means connecting said tubing heat exchanger with said heat exchanging means for heating or cooling said structure.

11. The apparatus of claim 8, wherein said heat exchanging means comprise at least one heat pump.

12. The apparatus of claim 8, wherein said heat exchanging means comprise several heat pumps connected in series with each other, said series connected heat pumps having a power rating stepped in accordance with the series connection.

13. The apparatus of claim 8, wherein said first inner wall means, said separation wall means, and said second outer enclosure wall means forming said first inner and said second outer hollow space, are so constructed that said inner first hollow space and said outer second hollow space surround a zone of said structure reaching into the atmosphere.

14. The apparatus of claim 8, wherein said structure is a building, and wherein said second outer enclosure wall means of said building are constructed as a siding of said building, said siding being attached to said building.

15. The apparatus of claim 8, wherein the first and second hollow spaces are constructed at least partially as a plurality of hollow channels (1') which are interconnected.

16. The apparatus of claim 8, wherein said first inner wall means, said separation wall means, and said second outer enclosure wall means comprise structural block type components including means for assembling said block type components to form said wall means, said block type components further comprising heat insulating features for forming a heat insulating shell for said structure when said block type components are assembled.

17. The apparatus of claim 9, wherein said structure is a building and wherein said collecting shaft or duct is formed by hallways present in the building and by stairways connected to said hallways.

18. The apparatus of claim 17, further comprising chimney flue means in said building, throughflow control devices in said chimney flue means and means connecting said chimney flue means to said heat recovering means for drawing-in and preheating of external air.

19. The apparatus of claim 8, comprising controllable openings for a controlled entry of external air into said inner volume inside said structure and further comprising control devices and adjustment means for controlling an external air input and an air quantity sucked out of said first inner hollow space by said suction pump.

20. The apparatus of claim 8, comprising at least one air collector and means for connecting or controllably connecting said air collector to said inner volume of said structure.

21. The apparatus of claim 8, comprising a heating system connected to said heat exchanging means, a heat exchanger (33) in said heating system for heating water.

22. The apparatus of claim 8, further comprising at least one adjustment member (31a, 31b) for controlling air quantities withdrawn from or pumped out of said inner volume and/or said first inner hollow space.

23. The apparatus of claim 22, wherein said adjustment member is arranged for influencing the temperature of cooled air.

24. The apparatus according to claim 21, comprising at least one circulating pump (34) in said heating system for causing fluid flow in tubing of said heating system, and a room thermostat connected to said circulating pump for increasing the fluid throughput in response to a deviation between a fluid temperature and the air temperature value required in said inner volume by switching-on said circulating pump.

25. The apparatus of claim 8, further comprising flow control means (30b, 31b) for controlling the volume of air withdrawn by said suction pump means, heating means (45) for controlling the temperature of said withdrawn air, and humidifying means for controlling the moisture content of said withdrawn air.

26. The apparatus of claim 8, wherein pipes for distributing heat connected to said heat exchanging means have a ratio of surface area to volume as large as possible.

* * * * *